(12) United States Patent
Rong et al.

(10) Patent No.: US 11,320,036 B2
(45) Date of Patent: May 3, 2022

(54) TRANSMISSION STRUCTURE OF MOTOR CONNECTION OF ROOTS PUMP

(71) Applicant: OVG Vacuum Technology (Shanghai) Co., Ltd., Shanghai (CN)

(72) Inventors: Yi Rong, Shanghai (CN); Yue Li, Shanghai (CN); Miaole Shen, Shanghai (CN)

(73) Assignee: OVG VACUUM TECHNOLOGY (SHANGHAI) CO., LTD, Shanghai (CN)

( * ) Notice: Subject to any disclaimer, the term of this patent is extended or adjusted under 35 U.S.C. 154(b) by 0 days.

(21) Appl. No.: 17/023,706

(22) Filed: Sep. 17, 2020

(65) Prior Publication Data

US 2021/0088121 A1    Mar. 25, 2021

(30) Foreign Application Priority Data

Sep. 23, 2019  (CN) .......................... 201921585611.1

(51) Int. Cl.
*F16H 57/00* (2012.01)
*F04C 2/12* (2006.01)
(Continued)

(52) U.S. Cl.
CPC ......... *F16H 57/0025* (2013.01); *F04C 2/126* (2013.01); *F04C 15/0057* (2013.01); *F16H 57/029* (2013.01)

(58) Field of Classification Search
CPC ............... F16H 57/0025; F16H 57/029; F16H 57/0427; F16H 57/0428; F16H 57/0472;
(Continued)

(56) References Cited

U.S. PATENT DOCUMENTS

| | | | |
|---|---|---|---|
| 2,694,978 A | 11/1954 | Berry | |
| 4,022,553 A | 5/1977 | Poole et al. | ........... 418/183 |

(Continued)

FOREIGN PATENT DOCUMENTS

| | | | |
|---|---|---|---|
| CN | 2667203 Y | 12/2004 | ............. F04C 18/08 |
| CN | 201396281 Y | 2/2010 | ............. F04C 18/14 |

(Continued)

*Primary Examiner* — Daniel D Yabut
(74) *Attorney, Agent, or Firm* — Renner, Kenner, Greive, Bobak, Taylor & Weber

(57) ABSTRACT

A transmission structure of motor connection of roots pump comprises a shaft sleeve, a motor shaft cavity is opened inside the shaft sleeve, and the inner circle of the motor shaft cavity is concentrically meshed with the excircle of the motor shaft; a fixed bolt mounting cavity is opened on the outer surface of the shaft sleeve, a bolt through-hole is opened in the fixed bolt mounting cavity, the shaft sleeve is fixedly connected with the gear seat through a hexagon bolt, and the gear seat and the shaft sleeve rotate synchronously at the same shaft center; a gear is fixedly connected with the gear seat with a bolt, the gear seat is fixed to the pump shaft through a first keyway under the fitting between the first keyway and a first shaft key, and the pump shaft and the motor shaft are coaxially arranged at the center. The utility model overcomes the disadvantages of the prior art, which is convenient to install without wearing parts, not affected by temperature, pressure and external dust; and the structure is simple with compound seal and oil protection function; and when a motor with a motor shaft is selected, only the diameter and keyway of the motor shaft cavity of the part are required to fit the new motor.

7 Claims, 4 Drawing Sheets

(51) Int. Cl.
*F04C 15/00* (2006.01)
*F16H 57/029* (2012.01)

(58) Field of Classification Search
CPC .............. F16H 2057/0216; F16C 33/80; F16C 33/805; F04C 2/126; F04C 15/0057
See application file for complete search history.

(56) References Cited

U.S. PATENT DOCUMENTS

| | | | | |
|---|---|---|---|---|
| 4,595,349 | A | 6/1986 | Preston et al. | 418/206 |
| 4,995,796 | A | 2/1991 | Kambe et al. | 418/9 |
| 5,090,879 | A | 2/1992 | Weinbrecht | 418/9 |
| 5,335,640 | A | 8/1994 | Feuling | 123/559.1 |
| 7,111,523 | B1 * | 9/2006 | Plangetis | F16D 1/0882 403/368 |
| 7,255,541 | B2 | 8/2007 | Kuramoto et al. | 417/410.3 |
| 8,082,784 | B2 | 12/2011 | Grzeslo | 73/261 |
| 8,215,937 | B2 | 7/2012 | Inagaki et al. | 418/206.7 |
| 8,308,458 | B2 | 11/2012 | Kettlewell et al. | 418/19 |
| 8,500,422 | B2 | 8/2013 | Dowdeswell et al. | 418/9 |
| 8,579,601 | B2 | 11/2013 | Kim | 417/251 |
| 9,062,675 | B2 | 6/2015 | Dixon et al. | F04C 15/0015 |
| 9,080,571 | B2 | 6/2015 | Downham et al. | F04C 29/04 |
| 9,745,978 | B2 | 8/2017 | Kobus et al. | F04C 15/0096 |
| 10,738,778 | B2 | 8/2020 | Hirano et al. | F04C 18/126 |
| 2002/0029646 | A1 * | 3/2002 | Takenaka | B60K 6/445 74/421 A |
| 2005/0069440 | A1 | 3/2005 | Naito | 418/9 |
| 2006/0222506 | A1 | 10/2006 | Rival | 417/2 |
| 2010/0135839 | A1 | 6/2010 | Fraser | 418/197 |
| 2017/0298733 | A1 | 10/2017 | Williams et al. | F01C 1/126 |
| 2019/0309756 | A1 | 10/2019 | Shaw et al. | F04C 15/0011 |
| 2019/0376552 | A1 * | 12/2019 | Ladyzhensky | F16D 1/094 |
| 2021/0088044 | A1 * | 3/2021 | Rong | F04C 15/0003 |

FOREIGN PATENT DOCUMENTS

| | | | |
|---|---|---|---|
| CN | 101985935 B | 3/2011 | F04C 18/14 |
| CN | 101985937 B | 3/2011 | F04C 18/14 |
| CN | 102828952 B | 12/2012 | F04C 25/02 |
| CN | 202690445 U | 1/2013 | F04C 23/00 |
| CN | 202851357 U | 4/2013 | F04C 18/14 |
| CN | 202867219 U | 4/2013 | F04C 18/14 |
| CN | 103089647 B | 5/2013 | F04C 18/14 |
| CN | 103486034 B | 1/2014 | F04C 25/02 |
| CN | 105222980 B | 1/2016 | G01M 9/04 |
| CN | 205383080 U | 7/2016 | F04C 23/02 |
| CN | 105864036 A | 8/2016 | F04C 18/12 |
| CN | 205779709 U | 12/2016 | F04C 23/00 |
| CN | 106499631 A | 3/2017 | F04C 18/12 |
| CN | 106949050 B | 7/2017 | F04C 18/12 |
| CN | 107061284 A | 8/2017 | F04C 25/02 |
| CN | 206377025 U | 8/2017 | F04C 18/04 |
| CN | 108317080 A | 7/2018 | F04C 18/12 |
| CN | 108799112 B | 11/2018 | F04C 18/12 |
| CN | 108953146 A | 12/2018 | F04C 18/12 |
| CN | 109026710 A | 12/2018 | F04C 18/12 |
| CN | 109058110 A | 12/2018 | F04C 18/12 |
| CN | 209414166 U | 9/2019 | F04C 23/00 |
| DE | 102014112317 A1 * | 3/2016 | F16H 57/08 |
| EP | 0953771 A1 | 11/1999 | F04C 23/00 |
| EP | 2461040 A1 | 6/2012 | F04C 18/12 |
| EP | 3434905 A1 | 1/2019 | F04D 19/04 |
| GB | 2417757 A | 3/2006 | F04C 18/14 |
| JP | 3-145594 | 6/1991 | F04C 29/04 |
| JP | 05272546 A * | 10/1993 | |
| JP | 05306720 A * | 11/1993 | |
| JP | 2009287579 A | 12/2009 | F16D 1/09 |
| WO | WO2020/160770 A1 | 8/2020 | F01C 21/10 |

* cited by examiner

TRANSMISSION STRUCTURE OF MOTOR CONNECTION OF ROOTS PUMP

TECHNICAL FIELD

The utility model relates to the technical field of roots vacuum pumps, particularly to a transmission structure of motor connection of roots pump.

BACKGROUND ART

The motor connection and transmission methods of roots vacuum pumps and roots fans common on the market are as follows, using elastic couplings, permanent magnetic couplings, hydraulic coupling couplings and straight blade motors.

The structure is relatively simple using the elastic coupling, and the motor and the pump shaft rotate synchronously, but the disadvantage is that the mounting clearance of the roots fan shall be considered for the installation of the roots vacuum pumps and roots fans, and the coupling will be seized when the installation is improper, even cause the pump shaft to interfere with the motor shaft, resulting in pump shaft deformation. The elastic coupling cannot solve sealing. When using the permanent magnetic coupling, because the pump shaft and the motor shaft are not in contact, the sealing effect is the best, but the disadvantage is that the motor and the pump shaft may not rotate synchronously. When the load of the pump exceeds the limit value, the motor speed and pump speed are not synchronized, generating heat. When the temperature of the permanent magnetic coupling exceeds the limit, demagnetization will occur. At the same time, the permanent magnetic coupling is relatively expensive and very inconvenient during installation. The overload motor of the pump will not be overloaded using hydraulic coupling. The sudden load of the pump will have a certain buffer to the motor, so as to ensure that the motor will not be overloaded. But the disadvantage is that the motor and the pump shaft may not rotate synchronously. At the same time, the hydraulic coupling uses coupling lubricating oil, which is easy to be polluted by the process medium gas. At the same time, the structure of the hydraulic coupling is complicated with inconvenient installation and high maintenance cost. The structure is simple with convenient installation and good sealing when using the straight blade motor. It can also solve the effect of pump overload on the motor buffer through the control of the inverter. However, the motor needs to be customized, which is expensive. Due to it belongs to non-standard products, when the motor fails, users can not directly purchase from the market and replace.

SUMMARY OF UTILITY MODEL

In view of the disadvantages of the prior art, the utility model provides a transmission structure of motor connection of roots pump, which overcomes the disadvantages of the prior art with reasonable design and convenient installation, without wearing parts, not affected by temperature, pressure and external dust; and the structure is simple with compound seal and oil protection function; and when a motor with a motor shaft is selected, only the diameter and keyway of the motor shaft cavity of the part are required to fit the new motor.

In order to achieve the above objectives, the utility model is achieved through the following technical solutions:

A transmission structure of motor connection of roots pump comprising a shaft sleeve, which is movably connected inside the motor connecting base, a motor shaft cavity is opened inside the shaft sleeve, and the inner circle of the motor shaft cavity is concentrically meshed with the excircle of the motor shaft; a fixed bolt mounting cavity is opened on the outer surface of the shaft sleeve, a bolt through-hole is opened in the fixed bolt mounting cavity, the shaft sleeve is fixedly connected with the gear seat through a hexagon bolt, and the gear seat and the shaft sleeve rotate synchronously at the same shaft center; a gear is fixedly connected with the gear seat with a bolt, the gear seat is fixed to the pump shaft through a first keyway under the fitting between the first keyway and a first shaft key, and the pump shaft and the motor shaft are coaxially arranged at the center.

Preferably, a slope is arranged in the fixed bolt mounting cavity, and the bolt through-hole is arranged at the bottom of the slope.

Preferably, four fixed bolt mounting cavities are provided, and all are independent cavity structures.

Preferably, a lock nut space is opened at one end of the shaft sleeve close to the pump shaft, the inner circle of the lock nut space is concentrically meshed with the excircle of the gear seat, a lock nut, sleeved on the outer surface of the pump shaft, is arranged inside the lock nut space.

Preferably, an oil guide pot is further provided on the outer surface of the sleeve, and the oil guide pot is arranged on the side of the fixed bolt mounting cavity away from the gear seat.

Preferably, a framework oil seal is fixedly installed between the shaft sleeve and the motor connecting base.

Preferably, a motor shaft keyway is opened inside the motor shaft cavity, a motor shaft key is arranged on the outer surface of the motor shaft, and the motor shaft key is matched with the motor shaft keyway.

The utility model provides a transmission structure of motor connection of roots pump. It has the following beneficial effects: by providing a fixed bolt mounting cavity on the surface of the shaft sleeve and arranging the fixed bolt mounting cavity as a slope, so during high-speed rotation, an airflow vortex will be formed, and most of oil droplets leaked from the small clearance will be held up by the airflow vortex of the fixed bolt mounting cavity, and will be gathered at the bottom by gravity or bounced back on the slope and held up by the oil guide pot for the second time; because the oil guide pot is very smooth without any slope, after the oil droplets drop into the oil guide pot, it will not be thrown out again, but flows into the bottom of the motor connecting base along the wall of the oil guide pot, and returns to the gear lubricating oil tank along the clearance for recycle; the installation is convenient without wearing parts, not affected by temperature, pressure and external dust.

DESCRIPTION OF DRAWINGS

In order to explain the technical solutions in the utility model or in the prior art more clearly, the brief introduction of drawings required in the description of the prior art is as follows.

DESCRIPTION OF NUMBERS IN THE DRAWINGS

1. Shaft sleeve; 2. Motor shaft cavity; 3. Motor shaft; 4. Fixed bolt mounting cavity; 5. Hexagon bolt; 6. Gear seat; 7. Gear; 8. Pump Shaft; 9. Bolt through-hole; 10. Lock nut space; 11. Lock nut; 12. Motor connecting base; 13. Oil guide pot; 14, Framework oil seal; 15. Motor shaft keyway. Embodiments In order to make the objectives, technical solutions and advantages of the utility model clearer, the technical solutions in the utility model will be described clearly and completely combined with the drawings in the utility model.

Figure 1:
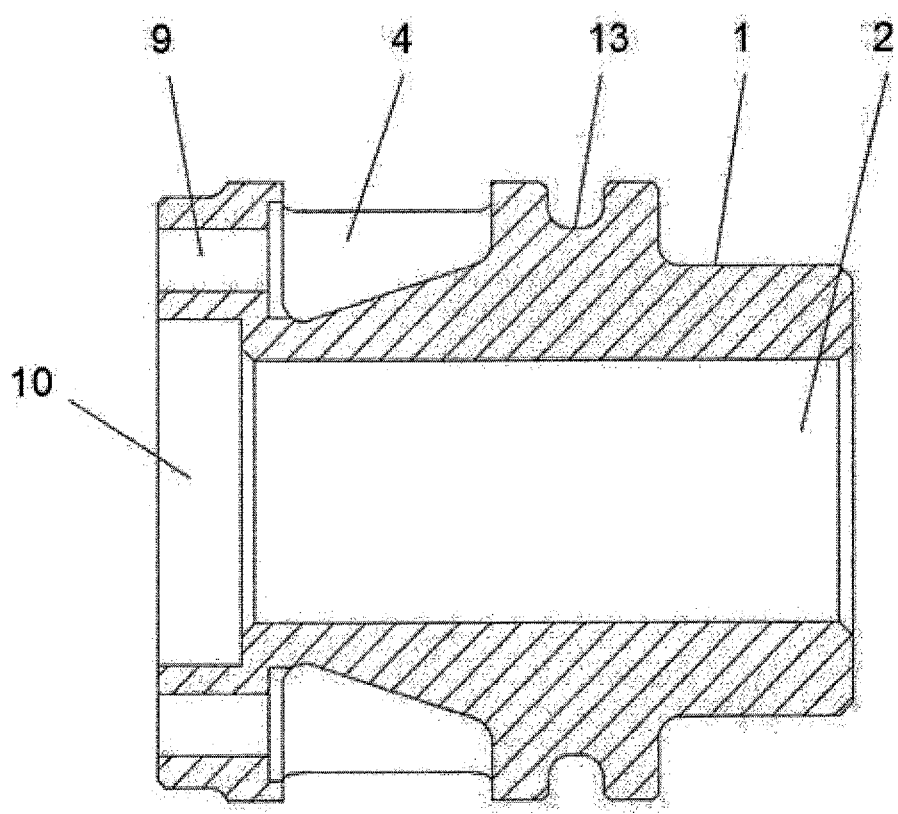
FIG. 1 is an elevation sectional view of the utility model.
Figure 2:
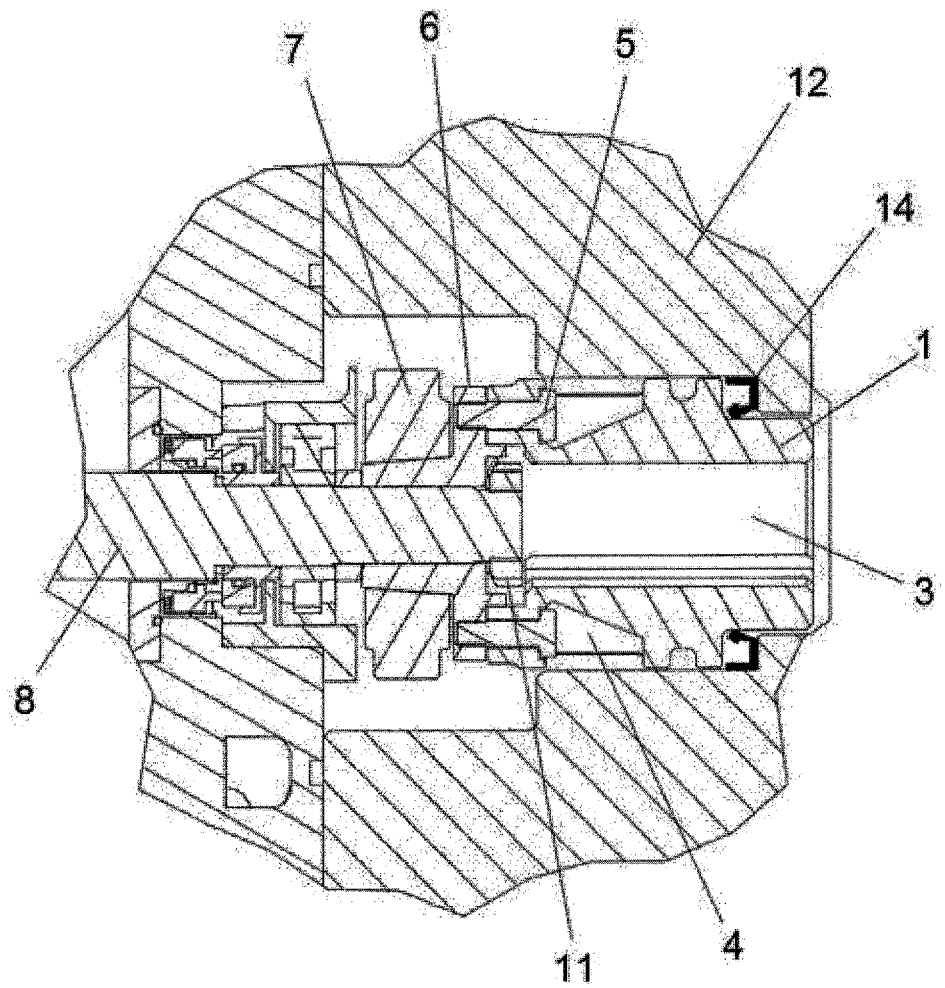
FIG. 2 is an elevation sectional view of the utility model after assembly.
Figure 3:
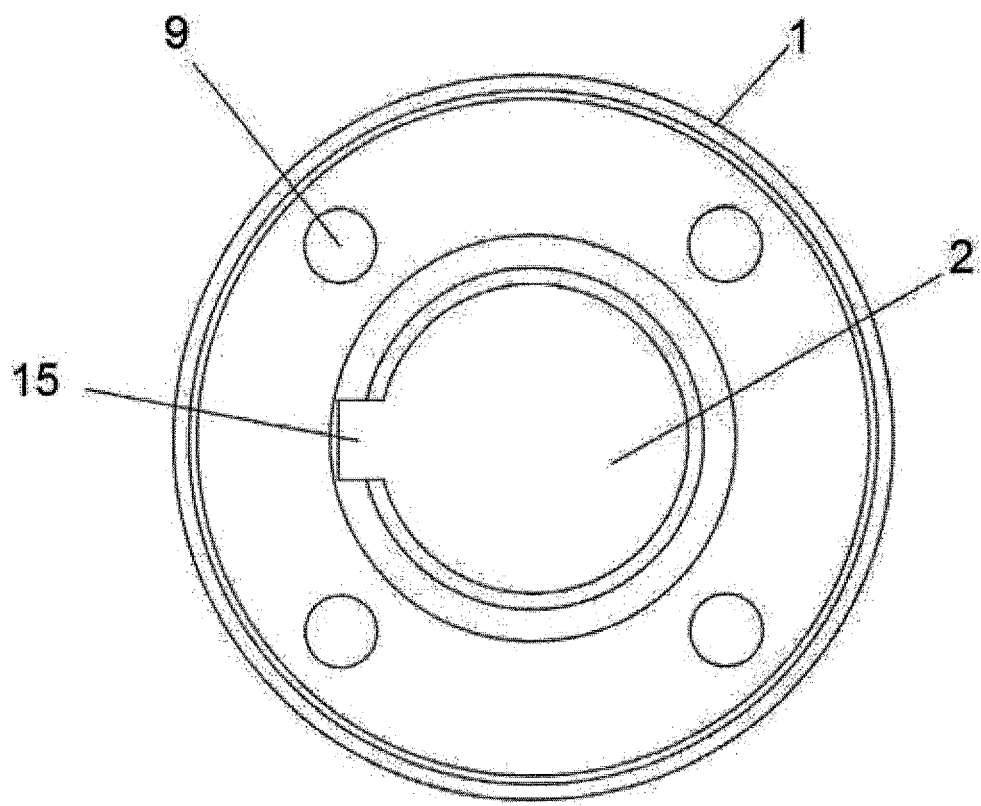
FIG. 3 is a front view of the utility model.
Figure 4:
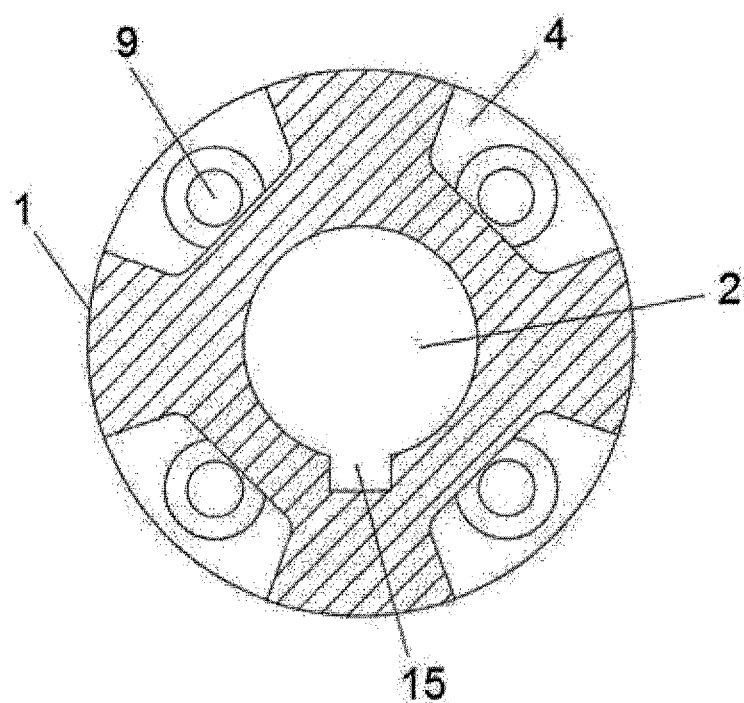
FIG. 4 is a sectional view of the front view of the utility model.
Figure 5:
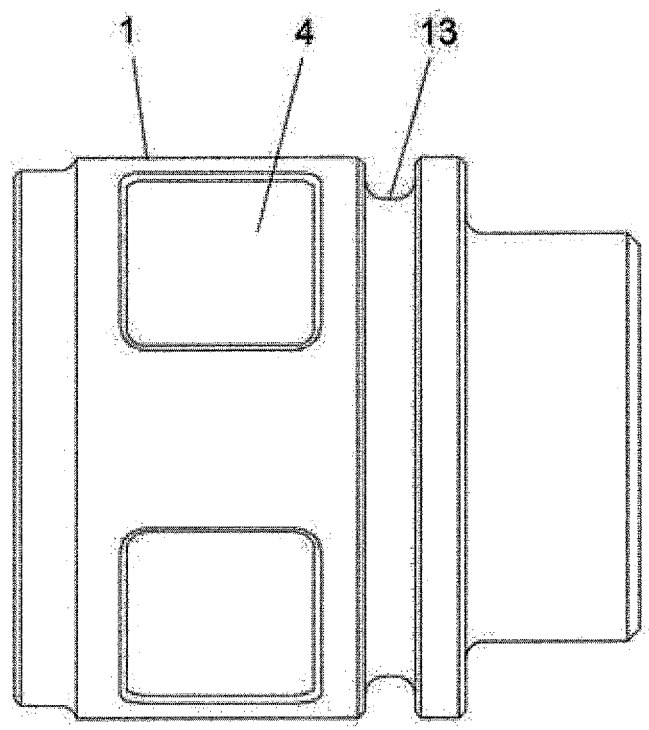
FIG. 5 is a side view of the utility model.

As shown in FIG. 1-5, a transmission structure of motor connection of roots pump comprises a shaft sleeve 1, which is movably connected inside the motor connecting base 12, a motor shaft cavity 2 is opened inside the shaft sleeve 1, and the inner circle of the motor shaft cavity 2 is concentrically meshed with the excircle of the motor shaft 3; a fixed bolt mounting cavity 4 is opened on the outer surface of the shaft sleeve 1, a bolt through-hole 9 is opened in the fixed bolt mounting cavity 4, the shaft sleeve 1 is fixedly connected with the gear seat 6 through a hexagon bolt 5, and the gear seat 6 and the shaft sleeve 1 rotate synchronously at the same shaft center; a gear 7 is fixedly connected with the gear seat 6 with a bolt, the gear seat 6 is fixed to the pump shaft 3 through a first keyway under the fitting between the first keyway and a first shaft key, and the pump shaft 8 and the motor shaft 3 are coaxially arranged at the center; a slope is arranged in the fixed bolt mounting cavity 4, and the bolt through-hole 9 is arranged at the bottom of the slope.

During operation, the inner circle of the motor shaft cavity 2 is concentrically meshed with the excircle of the motor shaft 3, and a certain clearance fit is ensured, so as to achieve the concentric shaft limit, to ensure that during high-speed rotation, the sleeve 1 and the motor shaft 3 are synchronously rotated at the same shaft center; the shaft sleeve 6 is fixedly connected with the gear seat 1 through a hexagon bolt 5, so as to ensure during high-speed rotation, the sleeve 1 and the gear seat 6 rotate synchronously at the same shaft center, which in turn drives the gear 7 to rotate synchronously, and under that action of limit and fixing of the gear 6 and pump shaft 8, drive the pump shaft 8 to rotate synchronously; a very high speed can be met at a lower power compared with the coupling.

During the high-speed rotation of gear 7, the lubricating oil on the surface of gear 7 will splash out, which plays the role of bearing and gear 7 lubrication and cooling, without the need for additional lubrication and Cooling; and in order to avoid the leakage of lubricating oil to the outside of the motor connection seat 12, the sleeve 1 and the motor connection seat 12 leave a small gap, and at the same time, a fixing bolt installation cavity 4 is provided on the surface of the sleeve 1, and the fixing bolt installation cavity 4 Set as a slope surface, so that when rotating at a high speed, an air flow vortex will be formed, and most of the oil droplets leaking from the small gap will be intercepted by the air flow vortex of the fixing bolt installation cavity 4 and collected by gravity The bottom, or dripping on the inclined surface and bounced back.

Further, four fixed bolt mounting cavities (4) are provided, and all are independent cavity structures. Since the fixed bolt mounting cavity 4 is not slotted along the radial circle, at the same time that the installation space of the hexagon bolt 5 is ensured, the strength of the shaft sleeve 1 is strengthened, which can ensure that the motor has sufficient strength to overcome the torque when driving the pump shaft 8.

Further, a lock nut space 10 is opened at one end of the shaft sleeve 1 close to the pump shaft 8, the inner circle of the lock nut space 10 is concentrically meshed with the excircle of the gear seat 6, a lock nut 11, sleeved on the outer surface of the pump shaft 8, is arranged inside the lock nut space 10. The lock nut space 10 is arranged as a reserved space, to ensure that the lock nut 11 and washer at the end of the pump shaft 8 will not interfere.

Further, an oil guide pot 13 is further provided on the outer surface of the sleeve 1, and the oil guide pot 13 is arranged on the side of the fixed bolt mounting cavity 4 away from the gear seat 6. The oil droplets not held up by the airflow vortex can be held up by the oil guide pot 13 for the second time, and because the oil guide pot is very smooth without any slope, after the oil droplets drop into the oil guide pot 13, it will not be thrown out again, but flows into the bottom of the motor connecting base 2 along the wall of the oil guide pot 13, and returns to the gear lubricating oil tank along the clearance for recycle.

Further, a framework oil seal 14 is fixedly installed between the shaft sleeve 1 and the motor connecting base 12. Moreover, the center line of the lip seal of the framework oil seal 14 is relatively high, so that a small amount of unheld oil droplets can be completely held up, thereby effectively blocking the lucubrating oil from leaking outside the motor connecting base 12.

Further, a motor shaft key slot 15 is opened inside the motor shaft cavity 2, a motor shaft key is provided on the outer surface of the motor shaft 3, and the motor shaft key matches the motor shaft key slot 15. When a motor with a motor shaft is selected, only the diameter and keyway of the motor shaft cavity of the part are required to fit the new motor. Moreover, the lock nut space 10 has a step, which also ensures that the motor shaft keyway 15 opened on the motor shaft cavity 2 does not affect the positioning of the inner circle by the lock nut space 10.

The above embodiments are only used to explain the technical solution of the utility model, but not to limit it; although referring to the aforesaid embodiments, the invention has been described in detail, those skilled in the art shall understand that the technical solutions described in the aforesaid embodiments can still be modified, or some of the technical features are equivalently replaced; and these modifications or replacements shall not make the essence of the corresponding technical solutions deviate from the spirit and scope of the technical solutions of the embodiments of the utility model.

The invention claimed is:

1. A transmission structure of motor connection of a roots pump comprising a shaft sleeve (1), is characterized in that:
   the shaft sleeve (1) is movably connected inside a motor connecting base (12), a motor shaft cavity (2) is opened inside a shaft sleeve (1), and an inner circle of the motor shaft cavity (2) is concentrically meshed with an excircle of a motor shaft (3);
   a fixed bolt mounting cavity (4) is opened on an outer surface of the shaft sleeve (1), a bolt through-hole (9) is opened in the fixed bolt mounting cavity (4), the shaft sleeve (1) is fixedly connected with a gear seat (6) through a hexagon bolt (5), and the gear seat (6) and the shaft sleeve (1) rotate synchronously at a same shaft center; and a gear (7) is fixedly connected with the gear seat (6), the gear seat (6) is fixed to a pump shaft (8), and the pump shaft (8) and the motor shaft (3) are coaxially arranged at a center.

2. The transmission structure of motor connection of a roots pump of claim 1, is characterized in that:
a slope is arranged in the fixed bolt mounting cavity (4), and the bolt through-hole (9) is arranged at the bottom of the slope.

3. The transmission structure of motor connection of a roots pump of claim 1, is characterized in that:
four fixed bolt mounting cavities (4) are provided, and all are independent cavity structures.

4. The transmission structure of motor connection of a roots pump of claim 1, is characterized in that:
a lock nut space (10) is opened a one end of the shaft sleeve (1) close to the pump shaft (8), the inner circle of the lock nut space (10) is concentrically meshed with an excircle of the gear seat (6), a lock nut (11) is sleeved on an outer surface of the pump shaft (8), and the lock nut (11) is arranged inside the lock nut space (10).

5. The transmission structure of motor connection of a roots pump of claim 1, is characterized in that:
an oil guide pot (13) is further provided on an outer surface of the sleeve (1), and the oil guide pot (13) is arranged on a side of the fixed bolt mounting cavity (4) away from the gear seat (6).

6. The transmission structure of motor connection of a roots pump of claim 1, is characterized in that:
a framework oil seal (14) is fixedly installed between the shaft sleeve (1) and the motor connecting base (12).

7. The transmission structure of motor connection of a roots pump of claim 1, is characterized in that:
a motor shaft keyway (15) is opened inside the motor shaft cavity (2), a motor shaft key is arranged on an outer surface of the motor shaft (3), and the motor shaft key is matched with the motor shaft keyway (15).

* * * * *